US011187538B2

(12) United States Patent
Zou et al.

(10) Patent No.: US 11,187,538 B2
(45) Date of Patent: Nov. 30, 2021

(54) METHOD FOR JUDGING ROTATING CHARACTERISTICS OF LIGHT SOURCES BASED ON SUMMATION CALCULATION IN VISIBLE LIGHT INDOOR POSITIONING

(71) Applicant: DALIAN UNIVERSITY OF TECHNOLOGY, Liaoning (CN)

(72) Inventors: Deyue Zou, Liaoning (CN); Yunfeng Liu, Liaoning (CN); Nan Zhao, Liaoning (CN); Xin Liu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 13 days.

(21) Appl. No.: 16/962,759

(22) PCT Filed: Jun. 13, 2019

(86) PCT No.: PCT/CN2019/091007
§ 371 (c)(1),
(2) Date: Jul. 16, 2020

(87) PCT Pub. No.: WO2020/248179
PCT Pub. Date: Dec. 17, 2020

(65) Prior Publication Data
US 2021/0116250 A1 Apr. 22, 2021

(51) Int. Cl.
*G01C 21/20* (2006.01)
*G01S 5/16* (2006.01)
*G06K 9/00* (2006.01)

(52) U.S. Cl.
CPC ............. *G01C 21/206* (2013.01); *G01S 5/16* (2013.01); *G06K 9/00691* (2013.01)

(58) Field of Classification Search
CPC ...... G01C 21/206; G01S 5/16; G06K 9/00691
(Continued)

(56) References Cited

U.S. PATENT DOCUMENTS 10,014,939 B2* 7/2018 Cha .................. H04W 4/029
10,768,302 B2* 9/2020 Lim .................. G01S 5/0263
(Continued)

FOREIGN PATENT DOCUMENTS

CN 101701968 A 5/2010
CN 105865458 A 8/2016
(Continued)

*Primary Examiner* — Danh C Le
(74) *Attorney, Agent, or Firm* — Muncy, Geissler, Olds & Lowe, P.C.

(57) ABSTRACT

A method for judging rotating characteristics of light sources based on summation calculation in visible light indoor positioning is disclosed. The method is implemented based on an LED positioning system, and comprises the following steps: firstly, arranging the light sources into a convex pattern in order, and arranging the emitted sequence for each light source according to set conditions; secondly, fixing the position and attitude of a cell phone as a receiving end, continuously shooting with the cell phone camera to obtain a set of light source pictures, and performing image processing to obtain emitted sequences of the light sources; thirdly, performing sequence correlation operation on adjacent light sources to obtain emitted sequence delays, and performing summation calculation on the emitted sequence delays, to judge true and false light sources; and finally, excluding the false light source, and then completing positioning using a positioning algorithm.

1 Claim, 2 Drawing Sheets

(58) Field of Classification Search
USPC .................................. 455/456.1, 550.1, 418
See application file for complete search history.

(56) References Cited

U.S. PATENT DOCUMENTS

| | | | | |
|---|---|---|---|---|
| 2012/0281879 | A1* | 11/2012 | Vlutters | G06K 9/2036 382/103 |
| 2014/0132530 | A1* | 5/2014 | Suh | G06F 3/0421 345/173 |
| 2016/0329963 | A1* | 11/2016 | Lv | H04B 10/116 |
| 2018/0240410 | A1* | 8/2018 | Yang | G09G 3/3291 |
| 2018/0287910 | A1* | 10/2018 | Sun | H04L 43/087 |
| 2019/0164306 | A1* | 5/2019 | Li | G06T 7/73 |
| 2019/0257754 | A1* | 8/2019 | Everett | G01N 21/6428 |
| 2021/0068234 | A1* | 3/2021 | Konishi | H05B 47/105 |
| 2021/0201057 | A1* | 7/2021 | Lin | G06K 9/3233 |
| 2021/0217379 | A1* | 7/2021 | Li | G06F 3/042 |
| 2021/0295026 | A1* | 9/2021 | Momcilovic | G06T 7/20 |

FOREIGN PATENT DOCUMENTS

| | | |
|---|---|---|
| CN | 106595662 A | 4/2017 |
| WO | WO-2014051783 A1 | 4/2014 |

\* cited by examiner

METHOD FOR JUDGING ROTATING CHARACTERISTICS OF LIGHT SOURCES BASED ON SUMMATION CALCULATION IN VISIBLE LIGHT INDOOR POSITIONING

TECHNICAL FIELD

The present invention belongs to the technical field of navigation positioning, and relates to a visible light indoor positioning method, in particular to a method for judging rotating characteristics of light sources based on summation calculation in visible light indoor positioning.

BACKGROUND

With the rapid development of the LED lighting industry, the visible light indoor positioning technology using LED lamps as light sources has gradually developed. Specular reflection caused objects, such as glass or mirrors in common indoor scenarios, may generate reflected fake light sources, thereby affecting the positioning reliability. Compared with the traditional method for distinguishing rotating characteristics of light sources, the present invention has the advantages that different light sources emit the same sequence, the proposed distinguishing method is simple and easy for calculation, and the number of IDs can be greatly increased.

SUMMARY

The present invention is use to solve following technical problem. The number of light source IDs is limited; the authenticity of light sources cannot be accurately distinguished when more light sources are used. The purpose of the present invention is to increase the number of IDs, increase the utilization rate of sequences, provide a method for distinguishing rotating characteristics of light sources, so as to distinguish the authenticity of light sources using the rotating characteristics and improve the positioning reliability.

To achieve the above purpose, the present invention adopts the following technical solution:

A method for judging rotating characteristics of light sources based on summation calculation in visible light indoor positioning. The method is implemented based on an LED positioning system, wherein the LED positioning system comprises one or more light source arrays (for each light source array, different light sources have different emitted sequence delays) and a user receiver. Considering that n light sources form one light source array, adjacent light sources of the light source array have emitted sequence delays according to a layout rule. If the n light sources of the same light source array are arranged according to anticlockwise or clockwise rotating characteristics, the emitted delays thereof are $h_1, h_2, h_3 \ldots h_n$. Rotating characteristics of false light sources are opposite, and the emitted sequence delays thereof are $P-h_0, P-h_2, P-h_3 \ldots P-h_n$, as shown in FIG. 1. The method specifically comprises the following steps (the flow is as shown in FIG. 2):

Step 1: arranging the light sources into a convex pattern in order:

forming a light source array by light sources $B_1, B_2, B_3 \ldots B_n$, and laying $B_1, B_2, B_3 \ldots B_n$ according to an anticlockwise or clockwise rule, to form a convex closed geometry.

Step 2: arranging the emitted sequence for each light source according to set conditions:

2.1) determining a positive integer parameter K, $0<K<n$.

2.2) Presetting one PN emitted sequence as the emitted sequence of all light sources, wherein the sequence length is P, in the sequence, "1" represents that a light source is bright, and "0" represents that a light source is dim (or opposite), the emitted sequences of the light sources are shown in FIG. 3.

2.3) Setting emitted sequence delays of adjacent light sources to $h_1, h_2, h_3 \ldots h_{n-1}$ in sequence at the sender according to the layout pattern order, wherein the set conditions are: $0 \leq h_i < P$, $h_i \in N$ and $$(K-1)P < \sum_{i=1}^{n-1} h_i \leq KP,$$

and $h_n = KP - (h_1 + h_2 + \ldots + h_{n-1})$ can be obtained through the set conditions.

The $h_1, h_2, h_3 \ldots h_n$ form a positive integer sequence $H_j$, where j is the ID number of the light source array. Different light source arrays are distinguished by using different sequences $H_j$, and no cyclic shift relationship is allowed between different sequences $H_j$.

Step 3: Fixing the position and attitude of a cell phone as the receiving end, to guarantee that the continuous shooting frequency is greater than or equal to the emitted sequence frequency, and continuously shooting with the cell phone camera to obtain a set of light source pictures $p_1, p_2 \ldots p_n$.

Step 4: Performing image processing to obtain emitted sequences of light sources:

performing image processing on the light source pictures obtained in step 3, counting pixels where faculae are located and surrounding faculae, finding out the positions of all faculae in n images, that is, finding out all light source points $B_1, B_2 \ldots B_n$; selecting one facula pixel, checking the n images in sequence to find out whether faculae exist in and around the facula pixel, if yes, indicating that the light source is bright and the sequence is emitting "1", otherwise, indicating that the light source is dim and the sequence is emitting "0", thereby obtaining an emitted sequence of a light source; and repeating the above operation to obtain the emitted sequences of all light sources.

Step 5: Performing sequence correlation operation on adjacent light sources to obtain emitted sequence delays:

randomly selecting a light source $B_j$, and performing sequence correlation operation on two adjacent light sources in the anticlockwise or clockwise direction, to obtain emitted sequence delays $h_1', h_2', h_3' \ldots h_n'$ between the light sources.

Step 6: Performing summation calculation on the emitted sequence delays: if the equation $$\sum_{i=1}^{n} h_i' = KP$$

is satisfied, the light source is a true light source; and if the equation $$\sum_{i=1}^{n} h_i' = (n-K)P$$

is satisfied, the light source is a false light source.

Step 7: Excluding the false light source, and then completing positioning using a positioning algorithm.

The present invention has the effects and benefits that: compared with other methods capable of distinguishing rotating characteristics of light sources, the present invention mainly has the advantages that the same emitted sequence is used to provide an emitted sequence for each light source and more IDs of light sources can be provided, and the method for distinguishing rotating characteristics is simple, effective and easy to implement.

DETAILED DESCRIPTION

Figure 1:
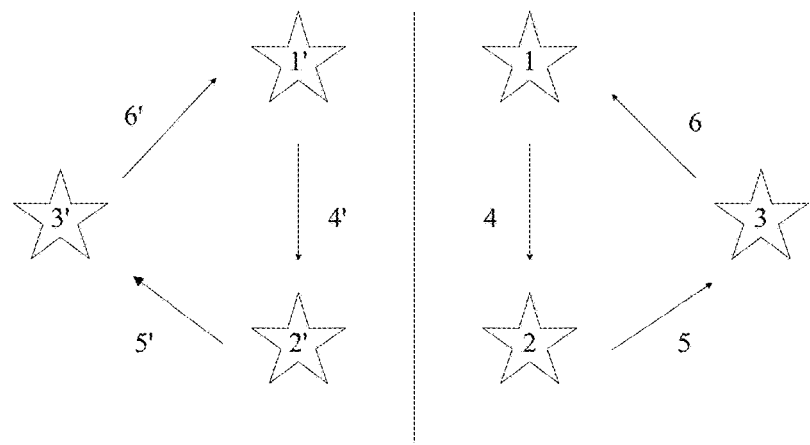
FIG. 1 is a schematic diagram of true and false light sources, where 1, 2, 3 represent true light sources, and 4, 5, 6 represent emitted sequence delays among light sources; and 1', 2', 3' represent false light sources, and 4', 5', 6' represent emitted sequence delays among false light sources.
Figure 2:
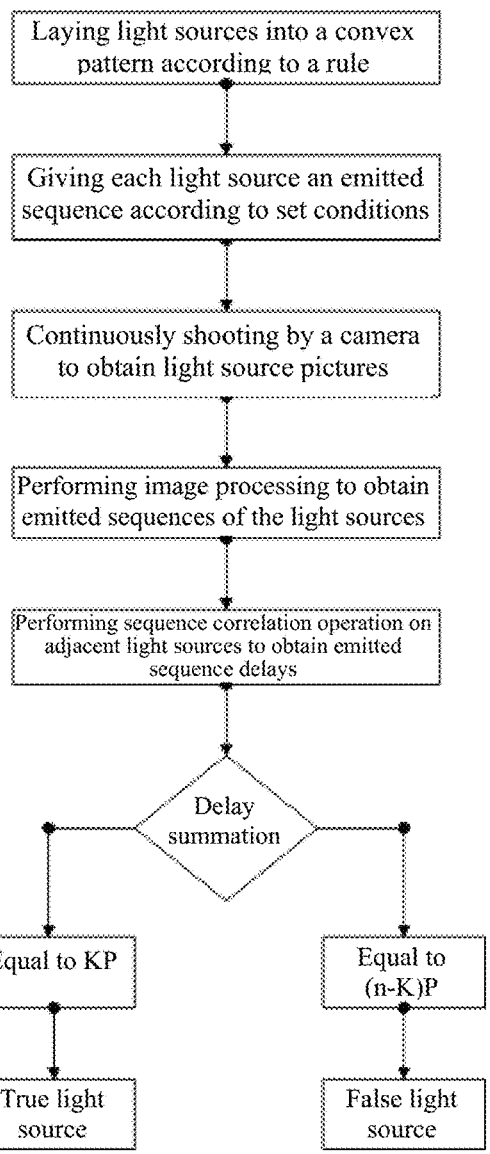
FIG. 2 is a detection flow chart.
Figure 3:
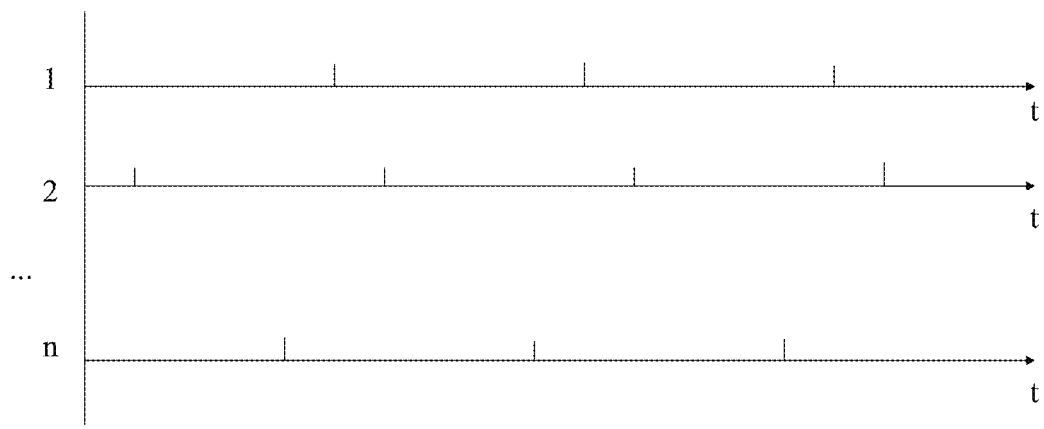
FIG. 3 is a diagram of emitted sequences of light sources, where 1, 2, . . . , n represent light sources.

The present invention is further described below in combination with specific embodiments.

In the specific implementation process, the emitted sequence delays are sent according to the set conditions given according to the emitted sequence delay value, and at the receiving end, the emitted sequence delays are calculated by correlation and the results are summed for verification.

(1) At the transmitting end, a group of emitted sequences with the sequence length of P=20 are selected to send IDs of light sources represented by different sequences. The light sources $B_1$, $B_2$, $B_3$ are laid according to an anticlockwise rule, to form a convex closed geometry.

(2) A positive integer is preset to K=1. Emitted sequence delays of adjacent light sources are set to $h_1=4$, $h_2=5$ at the sender according to a layout rule, so $h_3=11$.

(3) The position and attitude of a cell phone are fixed at the receiving end, to guarantee that the continuous shooting frequency is greater than or equal to the emitted sequence frequency, and continuous shooting is performed to obtain a set of pictures.

(4) Emitted sequences of light sources are obtained according to the image processing. A light source is randomly selected, and sequence correlation operation is performed on two adjacent light sources in the anticlockwise or clockwise direction, to obtain emitted sequence delays $h_1'$, $h_2'$, $h_3'$ between the light sources.

(5) Sequence correlation operation is performed on emitted sequences to obtain emitted sequence delays.

If the calculated delays are $h_1'=4$, $h_2'=5$, $h_3'=11$, 4+5+11=20, which satisfies $$\sum_{i=1}^{n} h_i' = KP,$$

it is proved that the rotating characteristics are anticlockwise, and the light source is a true light source.

If the calculated delays are $h_1'=P-h_1=16$, $h_2'=P-h_2=15$, $h_3'=P-h_3=9$, then 9+15+16=40=2 P, which satisfies $$\sum_{i=1}^{n} h_i' = (n - K)P,$$

it is proved that the rotating characteristics are opposite, and the light source is a false light source.

(6) The false light source is excluded, and then positioning is completed using the positioning algorithm.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. A method for judging rotating characteristics of light sources based on summation calculation in visible light indoor positioning, characterized in that the method is implemented based on an LED positioning system, wherein the LED positioning system comprises one or more light source arrays and a user receiver; considering that n light sources form one light source array, adjacent light sources of the light source array have emitted sequence delays according to a layout rule; if the n light sources of the same light source array are arranged according to anticlockwise or clockwise rotating characteristics, the emitted delays thereof are $h_1$, $h_2$, $h_3$ . . . $h_n$; rotating characteristics of false light sources are opposite, and the emitted sequence delays thereof are P-$h_1$, P-$h_2$, P-$h_3$ . . . P-$h_n$; the method specifically comprises the following steps:

Step 1: arranging the light sources into a convex pattern in order:
forming a light source array by light sources $B_1$, $B_2$, $B_3$ . . . $B_n$, and laying $B_1$, $B_2$, $B_3$ . . . $B_n$ according to an anticlockwise or clockwise rule, to form a convex closed geometry;

Step 2: arranging the emitted sequence for each light source according to set conditions:
2.1) determining a positive integer parameter K, 0<K<n;
2.2) presetting one PN emitted sequence as the emitted sequence of all light sources, wherein the sequence length is P, in the sequence, "1" represents that a light source is bright, and "0" represents that a light source is dim; and
2.3) setting emitted sequence delays of adjacent light sources to $h_1$, $h_2$, $h_3$ . . . $h_{n-1}$ in sequence at the sender according to the layout pattern order, wherein the set conditions are: 0<$h_i$<P, $h_i \in N$ and $$(K-1)P < \sum_{i=1}^{n-1} h_i \leq KP,$$

and $h_n$=KP-($h_1+h_2+ \ldots +h_{n-1}$) can be obtained through the set conditions;
the $h_1$, $h_2$, $h_3$ . . . $h_n$ form a positive integer sequence $H_j$, where j is the ID number of the light source array; different light source arrays are distinguished by using different sequences $H_j$, and no cyclic shift relationship is allowed between different sequences $H_j$;

Step 3: fixing the position and attitude of a cell phone as the receiving end, to guarantee that the continuous shooting frequency is greater than or equal to the emitted sequence frequency, and continuously shooting with the cell phone camera to obtain a set of light source pictures $p_1, p_2, \ldots p_n$;

Step 4: performing image processing to obtain emitted sequences of light sources:

performing image processing on the light source pictures obtained in step 3, counting pixels where faculae are located and surrounding faculae, finding out the positions of all faculae in n images, that is, finding out all light source points $B_1, B_2 \ldots B_n$; selecting one facula pixel, checking the n images in sequence to find out whether faculae exist in and around the facula pixel, if yes, indicating that the light source is bright and the sequence is emitting "1", otherwise, indicating that the light source is dim and the sequence is emitting "0", thereby obtaining an emitted sequence of a light source; and repeating the above operation to obtain the emitted sequences of all light sources;

Step 5: performing sequence correlation operation on adjacent light sources to obtain emitted sequence delays:

randomly selecting a light source $B_j$, and performing sequence correlation operation on two adjacent light sources in the anticlockwise or clockwise direction, to obtain emitted sequence delays $h_1', h_2', h_3' \ldots h_n'$ between the light sources;

Step 6: performing summation calculation on the emitted sequence delays: if the equation $$\sum_{i=1}^{n} h_i' = KP$$

is satisfied, the light source is a true light source; and if the equation $$\sum_{i=1}^{n} h_i' = (n-K)P$$

is satisfied, the light source is a false light source; and

Step 7: excluding the false light source, and then completing positioning using a positioning algorithm.

* * * * *